Jan. 13, 1925.
J. RAGGIS
1,523,350
AUTOMOBILE TOP
Filed Oct. 2, 1924
2 Sheets-Sheet 1
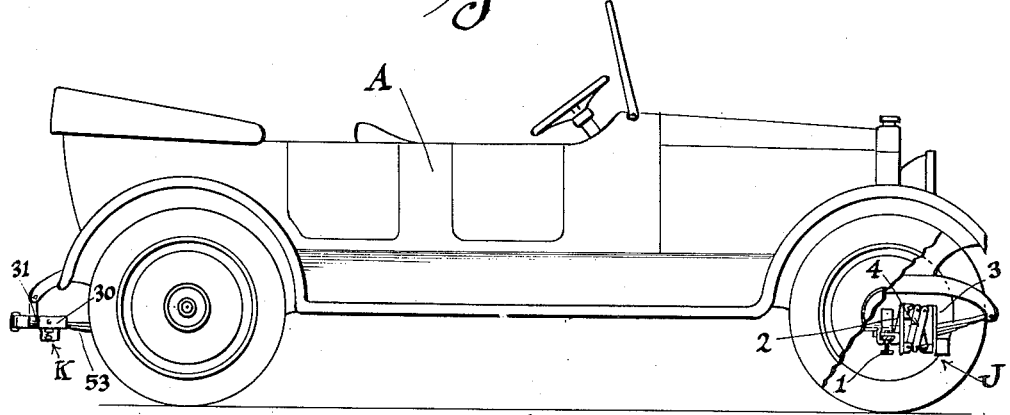
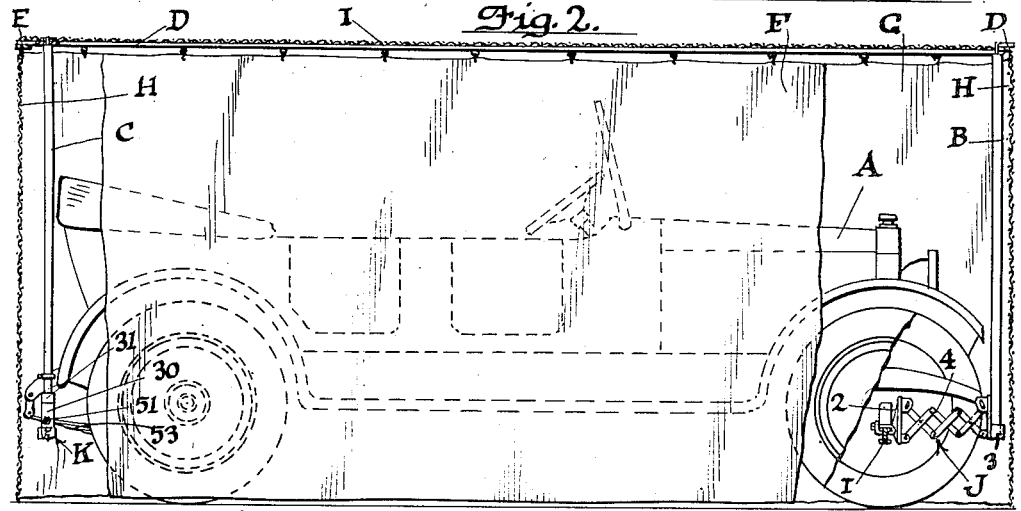
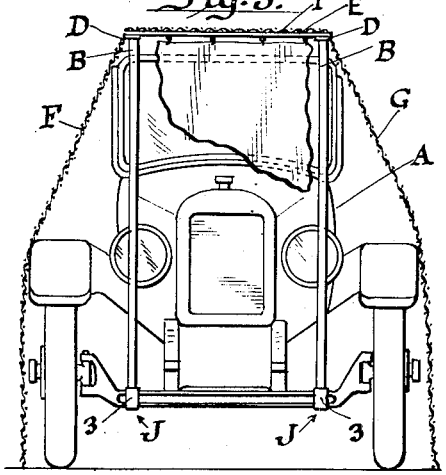
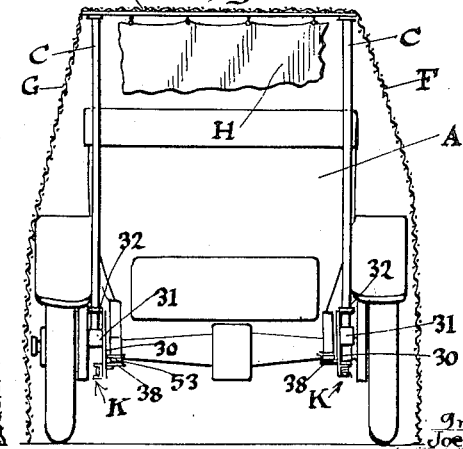

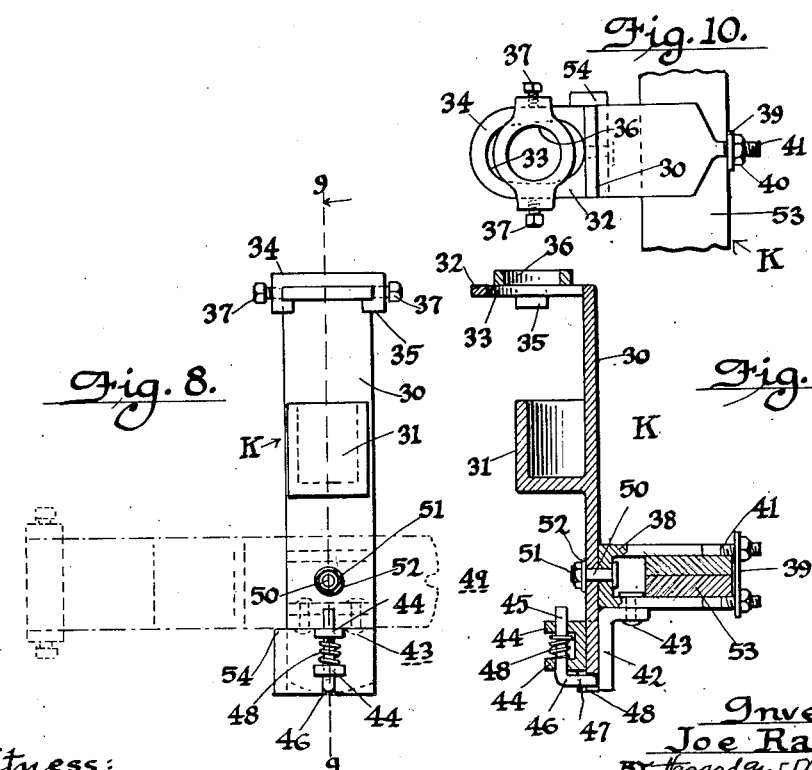

Patented Jan. 13, 1925.

1,523,350

UNITED STATES PATENT OFFICE.

JOE RAGGIS, OF LOS ANGELES, CALIFORNIA.

AUTOMOBILE TOP.

Application filed October 2, 1924. Serial No. 741,191.

*To all whom it may concern:*

Be it known that I, JOE RAGGIS, a citizen of Italy, residing at Los Angeles, in the county of Los Angeles and State of California, have invented new and useful Improvements in Automobile Tops, of which the following is a specification.

This invention relates to automobile tops or tent canopies as they are sometimes called.

It is an object of this invention to provide adjustable supporting means for the posts which hold the canvas cover.

The particular features of invention may be considered an improvement on my United States Patent No. 1,471,279, Oct. 16, 1923, for cover supports for motor vehicles.

In the particular embodiment of my invention I use at the front of the automobile a support which may be extended in front of the axle. At the rear end I use a swivel support. Both of these supporting brackets for the posts may thus be conveniently moved into a snug position for traveling and quickly adjusted to support the top or canopy.

The invention will be made manifest in the following specification and as illustrated in the accompanying drawings wherein—

Figure 1 is a side elevation of an automobile with the supporting brackets in their retracted or traveling positions.

Fig. 2 is a side view of the automobile with the top or canopy set up in position and illustrates the position of the supporting brackets when in use.

Fig. 3 is a front elevation of Fig. 2.

Fig. 4 is a rear elevation of Fig. 2.

Fig. 5 is a side view partially in section of the supporting brackets as attached to the front axle. This is illustrated in retracted position.

Fig. 6 is a top plan of Fig. 5.

Fig. 7 is an elevation of the right hand side of Fig. 5.

Fig. 8 is a side elevation of the supporting brackets as used at the rear of the automobile.

Fig. 9 is a vertical section of Fig. 8 on the line 9—9.

Fig. 10 is a plan view of the brackets of Figs. 8 and 9.

As shown on the drawings, A denotes an automobile. B and C are the posts at the front and rear thereof which support horizontal rods D and E. From these rods are draped the end and side curtains F, G and H and the top cover I, thus forming an automobile cover somewhat as illustrated in my patent above mentioned. The front supporting bracket is denoted by the letter J and the rear swiveling bracket by the letter K. The particular features of my invention relate especially to these two brackets.

The front extensible supporting bracket J is shown in position in Figs. 1 and 2 and in details in Figs. 5, 6 and 7. The front axle of the automobile is indicated dotted by the numeral 1. To this is secured a fixed bracket 2 with a forwardly extending socket bracket 3. The movement of the latter and its positioning is by means of the lazy-tong links 4. These may be of a suitable number, depending upon the extension desired. The link nearest the fixed bracket 2 is secured at the bottom thereof by a pin 5 to a lug 6. The bottom of the lazy-tong link nearest the moving bracket 3 is secured by a pin 7 to a lug 8 at the bottom of the bracket 3. The upper end of the lazy-tong link adjacent the stationary bracket 2 is secured by a pin 9 having the locking nut 9', which pin has a sliding movement in the slot 10 provided on the lug 11 forming an integral part of the stationary bracket 2. The upper end of the lazy-tong link adjacent the moving support 3 has a pin 12 which has sliding movement in the slot 13 formed in a lug 14 which latter is an integral part of the moving support 3. On the pin 12 there could be used an adjusting nut similar to 9'. The lower ends of the intermediate links 4 are secured pivotally by a pin 15 and their upper ends by a pin 16. In the center of the links is a pin 17 which allows the usual lazy-tong action.

The bracket above described is secured to the front axle by a hook-shaped clamp 18 which is rigidly secured to or an integral part of the stationary bracket 2. Co-operating with the clamp 18 is a movable clamp 19 adjusted and secured in rigid position by the nut 20 engaging the screw threads 21. By this construction the socket 22 which is secured to or an integral part of the movable support 3 is attached to the front axle 1 in an adjustable manner.

In traveling position the front supporting bracket J is in retracted position as illustrated in Figs. 1 and 5 and is thus held in such position by the lock nut 9'. When it is desired to extend the bracket J to support the front posts, the bracket is extended forwardly by moving —the socket bracket 3 which may be held in any desired position by the lock nut 9' and additionally if desired by a lock nut on the pin 12. It will be understood that there are two brackets J, one on each side of the automobile and supporting the posts B in the socket 22.

The rear swiveling bracket K for supporting the posts C is shown in traveling position in Fig. 1 and in operative position in Fig. 2, and details are given in Figs. 8, 9 and 10. This bracket is formed of a bar of metal 30 which supports or has formed integral therewith a post socket 31. The bar 30 is bent horizontally at the upper end to form an angle 32 which has an enlarged aperture 33. On this angle member 32 there is slidably mounted an adjusting guide 34 having arms 35 engaging the opposite side of the angle 32. This adjustable guide has an aperture 36 of such size as to form a snug fit with the posts C and is adjusted into proper position by means of the set screws 37.

A U-shaped clamp 38 has a sliding washer 39 adjustably held in position by the nuts 40 on the screw threaded arms 41. An angular socket 42 is secured to the U-shaped clamp 38 by means of a rivet 43. However, the clamp 38 and the socket 42 may be formed integral. The socket 42 is formed with two lugs 44 having apertures 45 in which a locking pin 46 having a horizontal finger 47 has sliding movement. This pin is held normally in upward or retracted position by a spring 48, whereby the horizontal finger 47 is held in the notch 49 formed on the bottom of the bar 30 when in operative position.

The bar 30 has a swiveling engagement with the clamp 38 and its attached socket 42 by means of a pin 50 having a lock nut 51 and spring washer 52. By this means the bar 30 is attached in a pivoted or swiveling manner to the spring 53 which is illustrated as the rear spring of the automobile. When it is desired to move the rear swiveling bracket from its operative to the traveling position, it is merely necessary to move the locking pin 46 downward out of engagement with the notch 49 and swivel the bar 30 until it rests on the shoulder 54, which is an integral part of the socket 42. It is held in this position by means of the lock nut 51 and spring washer 52, and is shown in such position in dotted lines in Fig. 8 and in full lines in Fig. 1. It will be understood that there will be a rear swiveling bracket K on each side of the automobile where side springs are used.

It will thus be seen that in a simple manner the front supporting bracket J may be extended forwardly and the rear swiveling bracket K may be swung upwardly from the traveling position to the position for supporting the top or canopy posts. These posts and the various rods for supporting the curtains may be conveniently stowed in the automobile when traveling and quickly adjusted to form a cover. With my arrangement it will be seen that the automobile could be used for traveling with the top covering the whole machine as shown in Fig. 2 and having the side, front and rear curtains conveniently stowed or fastened in a secure manner.

Further embodiments and modifications of my invention may be resorted to within the spirit of my invention as herein claimed.

What is claim is:

1. An automobile top comprising in combination an adjustable post support secured at one end of the automobile, a post support secured at the opposite end of the automobile, posts held in said supports, rods attached to said posts, and protective curtains fastened to said rods.

2. An automobile top comprising in combination an adjustable post support secured at one end of the automobile, a swiveled post support secured at the opposite end of the automobile, posts held in said supports, rods attached to said posts, and protective curtains fastened to said rods.

3. An automobile top comprising in combination an adjustable front post support extensible forwardly, a rear post support swiveling vertically, posts held in said supports, rods attached to said posts, and protective curtains fastened to said rods.

4. An automobile top comprising in combination an adjustable front post support attached to the front axle and extensible forwardly therefrom, a rear post support swiveling vertically, posts held in said supports, rods attached to said posts, and protective curtains fastened to said rods.

5. An automobile top comprising in combination an adjustable front post support extensible forwardly, a rear post support attached to the rear spring to swivel vertically, posts held in said supports, rods attached to said posts, and protective curtains fastened to said rods.

6. An automobile top comprising in combination an adjustable front post support attached to the front axle and extensible forwardly therefrom, a rear post support attached to the rear spring to swivel vertically, posts held in said supports, rods attached to said posts, and protective curtains fastened to said rods.

7. An element of an automobile top comprising a supporting bracket having a fixed bracket secured to the automobile, a socket bracket movable toward and from said fixed bracket, and means for securing said brackets in relative adjustable positions.

8. An element of an automobile top comprising a supporting bracket having a fixed bracket secured to the automobile, a socket bracket movable toward and from said fixed bracket, links connecting said brackets and forming a lazy-tong whereby said socket bracket may be moved to and from said fixed bracket, and means for securing a link of said lazy-tong in a desired position, thereby obtaining a relative adjustment of the brackets.

9. An element of an automobile top comprising a supporting bracket having a fixed bracket secured to the front axle, a socket bracket movable toward and from said fixed bracket, end links having a pivotal connection to each bracket and a sliding connection with another portion of each bracket, and means to secure the sliding connection in a desired adjusted position.

10. An element of an automobile top comprising a clamp to be secured to the automobile, a socket attached to said clamp, a post socket bar having a pivotal connection to the clamp and socket, and a locking pin having engagement between the socket and the post socket bar whereby said bar may be maintained in operative position.

11. An element of an automobile top comprising a clamp to be secured to the automobile, a socket attached to said clamp, a post socket bar having a pivotal connection to the clamp and socket, a locking pin having engagement between the socket and the post socket bar whereby said bar may be maintained in operative position, a shoulder on said socket, and a locking means for holding said post socket bar out of operative position.

In testimony whereof I have signed my name to this specification.

JOE RAGGIS.